(12) United States Patent
De Vries et al.

(10) Patent No.: US 10,843,665 B2
(45) Date of Patent: Nov. 24, 2020

(54) WINDSCREEN WIPER DRIVE OF A WINDSCREEN WIPER DEVICE OF A RAIL VEHICLE

(71) Applicant: KNORR-BREMSE GESELLSCHAFT MIT BESCHRÄNKTER HAFTUNG, Mödling (AT)

(72) Inventors: Gerhardus De Vries, Mödling (AT); Gerd Noll, Mödling (AT)

(73) Assignee: KNORR-BREMSE GESELLSCHAFT MIT BESCHRÄNKTER HAFTUNG

( * ) Notice: Subject to any disclaimer, the term of this patent is extended or adjusted under 35 U.S.C. 154(b) by 281 days.

(21) Appl. No.: 15/575,241

(22) PCT Filed: May 18, 2016

(86) PCT No.: PCT/EP2016/000821
§ 371 (c)(1),
(2) Date: Nov. 17, 2017

(87) PCT Pub. No.: WO2016/184566
PCT Pub. Date: Nov. 24, 2016

(65) Prior Publication Data
US 2018/0134255 A1    May 17, 2018

(30) Foreign Application Priority Data
May 19, 2015   (DE) ......................... 10 2015 006 356

(51) Int. Cl.
*B60S 1/16*       (2006.01)
*H02K 21/24*   (2006.01)
(Continued)

(52) U.S. Cl.
CPC ............. *B60S 1/166* (2013.01); *B60S 1/0807* (2013.01); *B60S 1/185* (2013.01); *B60S 1/26* (2013.01);
(Continued)

(58) Field of Classification Search
CPC .... B60S 1/06; B60S 1/08; B60S 1/163; B60S 1/16; B60S 1/166; B60S 1/26;
(Continued)

(56) References Cited

U.S. PATENT DOCUMENTS 2,856,212 A * 10/1958 Sacchini ............... B60S 1/3418
                                                                    464/182
3,524,250 A *   8/1970 Burr ....................... H02K 13/04
                                                                     29/597
(Continued)

FOREIGN PATENT DOCUMENTS

DE         3116898 A1    4/1982
DE       19525093 A1    1/1997
(Continued)

OTHER PUBLICATIONS

Machine language translation of description portion of WO publication 87/02968, published Jan. 1997 (Year: 1997).*
(Continued)

*Primary Examiner* — Gary K. Graham
(74) *Attorney, Agent, or Firm* — Barnes & Thornburg LLP

(57) ABSTRACT

Disclosed embodiments relate to a windscreen wiper drive of a windscreen wiper device of a rail vehicle. The drive includes at least one electric motor, a gear, the input shaft of which being connected to an output shaft of the electric motor, wherein an output shaft of the gear is provided for driving at least one windscreen wiper arm of a windscreen wiper, which arm swings back and forth with the output shaft, a rotation angle sensor unit, which detects a rotation of at least one element of the windscreen wiper drive, and a mechanical rotation angle limitation, which mechanically limits a rotational movement of at least one element of the (Continued)

windscreen wiper drive. The electric motor is formed by a disc motor and the gear is formed by a planetary gear.

18 Claims, 4 Drawing Sheets

(51) Int. Cl.
| | |
|---|---|
| *H02K 23/54* | (2006.01) |
| *B60S 1/34* | (2006.01) |
| *B60S 1/18* | (2006.01) |
| *B60S 1/08* | (2006.01) |
| *B60S 1/26* | (2006.01) |
| *F16H 19/00* | (2006.01) |
| *H02K 1/17* | (2006.01) |
| *H02K 3/26* | (2006.01) |
| *H02K 3/47* | (2006.01) |
| *H02K 7/116* | (2006.01) |
| *H02K 13/00* | (2006.01) |
| *B61D 49/00* | (2006.01) |
| *F16H 1/28* | (2006.01) |

(52) U.S. Cl.
CPC .......... *B60S 1/3404* (2013.01); *F16H 19/001* (2013.01); *H02K 1/17* (2013.01); *H02K 3/26* (2013.01); *H02K 3/47* (2013.01); *H02K 7/116* (2013.01); *H02K 13/006* (2013.01); *H02K 21/24* (2013.01); *H02K 23/54* (2013.01); *B61D 49/00* (2013.01); *F16H 1/28* (2013.01); *F16H 2019/008* (2013.01)

(58) Field of Classification Search
CPC .... B60S 1/0807; B60S 1/3404; B60S 1/3406; B60S 1/3409; B60S 1/345; B60S 1/3459; B60S 1/185; H02K 1/17; H02K 3/26; H02K 3/47; H02K 7/116; H02K 13/006; H02K 21/24; H02K 23/54; F16H 19/001; F16H 1/28; F16H 2019/008; B61D 49/00
USPC .... 15/250.3, 250.31, 250.21, 250.23, 250.34
See application file for complete search history.

(56) References Cited

U.S. PATENT DOCUMENTS

| | | | |
|---|---|---|---|
| 4,360,751 A | 11/1982 | Arnold, Jr. et al. | |
| 6,374,451 B1* | 4/2002 | Kalbas | B60S 1/34 15/250.23 |
| 6,629,905 B1 | 10/2003 | Sesselmann et al. | |
| 7,038,338 B2 | 5/2006 | Sesselmann et al. | |
| 8,171,597 B2* | 5/2012 | Yagi | B60S 1/166 15/250.3 |
| 8,684,128 B2 | 4/2014 | Bieber et al. | |
| 9,074,669 B2 | 7/2015 | Hikida et al. | |
| 2005/0231063 A1* | 10/2005 | Knorre | H02K 3/26 310/268 |
| 2005/0242762 A1* | 11/2005 | Assan | B60S 1/0814 318/443 |
| 2006/0053577 A1 | 3/2006 | Moein et al. | |
| 2016/0250998 A1 | 9/2016 | De Vries et al. | |
| 2016/0288771 A1 | 10/2016 | De Vries et al. | |

FOREIGN PATENT DOCUMENTS

| | | |
|---|---|---|
| DE | 9717238 A1 | 5/1997 |
| DE | 19816210 A1 | 10/1999 |
| DE | 19944915 A1 | 3/2001 |
| DE | 10024907 A1 | 12/2001 |
| DE | 102004025590 A1 | 12/2005 |
| DE | 102012023638 A1 | 6/2013 |
| DE | 102012111127 A1 | 5/2014 |
| DE | 102010041744 T2 | 7/2016 |
| EP | 0837799 A2 | 4/1998 |
| EP | 1403155 A2 | 3/2004 |
| FR | 647006 A | 11/1928 |
| JP | S5885744 A | 5/1983 |
| WO | 9702968 | 1/1997 |
| WO | 2015049290 A1 | 4/2015 |

OTHER PUBLICATIONS

International Search Report for International Patent Application No. PCT/EP2016/000821; dated Jul. 21, 2016.

* cited by examiner

WINDSCREEN WIPER DRIVE OF A WINDSCREEN WIPER DEVICE OF A RAIL VEHICLE

PRIORITY CLAIM

This patent application is a U.S. National Phase of International Patent Application No. PCT/EP2016/000821, filed May 18, 2016, which claims priority to German Patent Application No. 10 2015 006 356.1, filed May 19, 2015, the disclosures of which are incorporated herein by reference in their entirety.

FIELD

Disclosed embodiments provide a windshield wiper drive that exhibits high dynamics and exhibits a high torque while being of simultaneously small structural size.

SUMMARY

Disclosed embodiments are based on a windshield wiper drive of a windshield wiper apparatus of a rail vehicle.

DESCRIPTION OF THE FIGURES

Disclosed embodiments are described in more detail below with reference to the appended drawings, in which.

DETAILED DESCRIPTION

Figure 1:
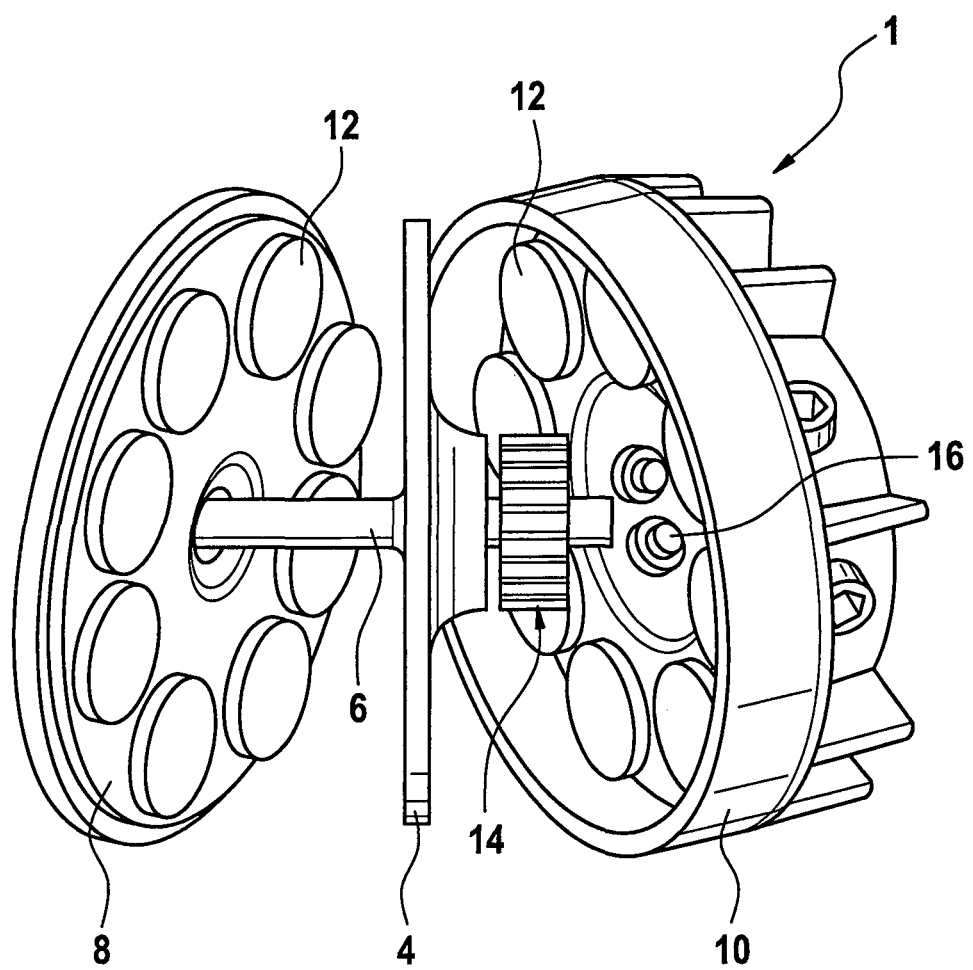
FIG. 1 shows a perspective view of a disk motor, such as is used in a windshield wiper drive according to a disclosed embodiment, in a disassembled state.

A rail vehicle is to be understood to mean a track-bound vehicle such as a locomotive, a rail motor set, a rail motor coach, a streetcar, a subway vehicle, a wagon such as a passenger train and/or freight car, in particular a high-speed rail vehicle.

It is provided according to the invention that the electric motor is formed by a disk motor, and the gearing may be formed by a planetary gearing.

A disk motor of the type generally exhibits a high torque while being of small structural length. Owing to the construction of a disk motor, the latter exhibits high dynamics, which are predestined for rapid wiping movements. Owing to the generally ironless rotor, no or only little brush sparking occurs. As a result, brush wear may also be reduced to a minimum.

Furthermore, planetary gearings generally exhibit high efficiency, are of compact construction, and exhibit little or no play.

Such an embodiment also in particular satisfies the high requirements for use on rail vehicles with regard to EMC, IP class, vibration resistance and ambient temperature.

Furthermore, in addition to use of the windshield wiper drive for a windshield wiper with only a main arm, use for a windshield wiper with a main arm and a secondary or parallel wiper arm may also be possible. Altogether, a long service life may be achieved as a result of the omission of the lever mechanism and the associated axial forces on the disk motor.

The disk motor particularly may have an ironless, disk-shaped rotor, which may be composed of an insulating material and on one or both sides of which there are arranged conductor tracks, at least one motor cover, which forms a stator and on which there are arranged permanent magnets which are situated opposite the conductor tracks, and a commutator. The commutator has for example brush holders and carbon brushes guided therein.

The output shaft of the disk motor may be formed by a rotor shaft which bears the rotor.

In one refinement, the disk motor forms a structural unit together with the planetary gearing. This may be realized for example by virtue of the disk motor and the planetary gearing having a common housing, or by virtue of a separate housing of the disk motor being flange-mounted directly onto a separate housing of the planetary gearing. This yields a modular and scalable construction of the windshield wiper drive.

In particular, the output shaft of the disk motor may be directly connected to the input shaft of the planetary gearing, or a gearwheel of the planetary gearing may be arranged directly on the output shaft of the disk motor. This yields a compact construction of the windshield wiper drive.

The output shaft of the planetary gearing particularly may have a receptacle for the direct mounting of the windshield wiper arm of the windshield wiper. In particular, no further mechanical transmission or coupling elements are provided between the output shaft of the planetary gearing and the windshield wiper arm.

This yields a rigid drive train of the windshield wiper drive, because the rotor of the disk motor introduces its rotational movement directly into the planetary gearing, which transmits the rotational movement, for example with a speed reduction, to its output shaft, to which the windshield wiper arm of the windshield wiper may be then directly connected.

The rotational angle sensor device may have at least one contactless rotational angle sensor for detecting the actual position of the windshield wiper arm. The actual position of the windshield wiper arm can then be used for control or regulation of the position of the windshield wiper arm in the context of a setpoint-actual alignment. It is also thereby possible for not only the end positions of the windshield wiper arm but also any desired intermediate position to be set or adjusted to.

Owing to the potentially analogue signal of the for example contactless rotational angle sensor, reliable information regarding the present position of the windshield wiper shaft or of the windshield wiper arm may be available at all times.

In one refinement, the rotational angle sensor device has at least one contactless magnetic field sensor which may be coupled to the output shaft of the planetary gearing or to a rotary element which may be coupled to the output shaft.

Here, in particular, a permanent magnet of the contactless rotational angle sensor may be connected rotationally conjointly to a shaft of the windshield wiper drive. The rotational angle sensor may for example be arranged within a housing of the disk motor or of the structural unit composed of disk motor and planetary gearing, and may detect the rotational angle of the rotor shaft of the disk motor. This embodiment may be preferred for example if the windshield wiper drive has only a single output shaft in the form of a main arm shaft.

Alternatively, the windshield wiper drive may have, at the output side, a main arm shaft, which may be driven in rotation by the output shaft of the planetary gearing, and a secondary or parallel arm shaft, which may be driven in rotation by rotation of the main arm shaft, wherein the main arm shaft may be designed for the fastening of a main arm and the secondary or parallel arm shaft may be designed for the fastening of a secondary or parallel arm of the windshield wiper. In such a case, the rotational angle sensor may be arranged and designed to detect the rotational angle of the secondary or parallel arm shaft of the windshield wiper drive.

The mechanical rotational angle delimiter may have a projection, which may be driven by a shaft of the windshield wiper drive, and a static delimiting element, which has a recess into which the projection projects, wherein delimiting surfaces of the recess constitute stop surfaces for the projection. In particular, the mechanical rotational angle delimiter may be designed to be adjustable, that is to say such that delimiting surfaces or mechanical stops of the rotational angle delimiter are adjustable or variable in terms of their position. It would alternatively also be possible for the delimiting surfaces or mechanical stops to be fixedly predefined.

Here, the projection may be arranged on the main arm shaft of the windshield wiper drive and formed for example as a projecting lug on a clamping ring, which may be fastened on the main arm shaft or on the secondary arm or parallel arm shaft.

Optionally, an electrical or electronic control device may be provided for controlling the disk motor in a manner dependent on signals of the rotational angle sensor device. In one refinement, the electrical or electronic control device may be designed for 4-quadrant operation of the disk motor. Flexible setting of the wiper arm position is thus possible.

The planetary gearing may be designed to reduce the rotational speed of the disk motor, whereby the already high torque of the disk motor may be further increased.

The invention also relates to a windshield wiper apparatus comprising a windshield wiper drive as described above, and to a rail vehicle having a windshield wiper apparatus of the type.

Figure 2:
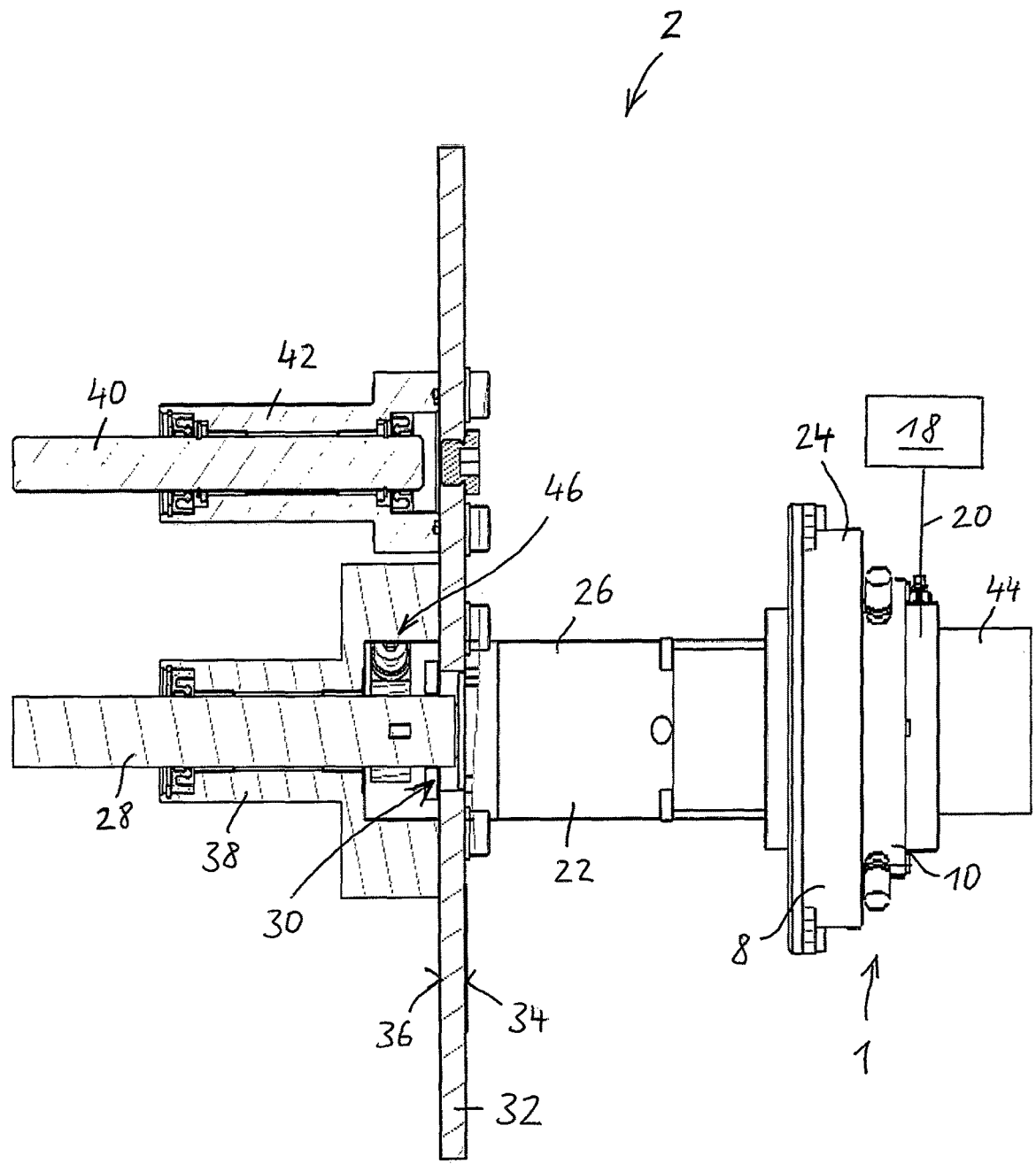
FIG. 2 shows a partial longitudinal section through a windshield wiper drive according to a first embodiment of the invention.
Figure 3:
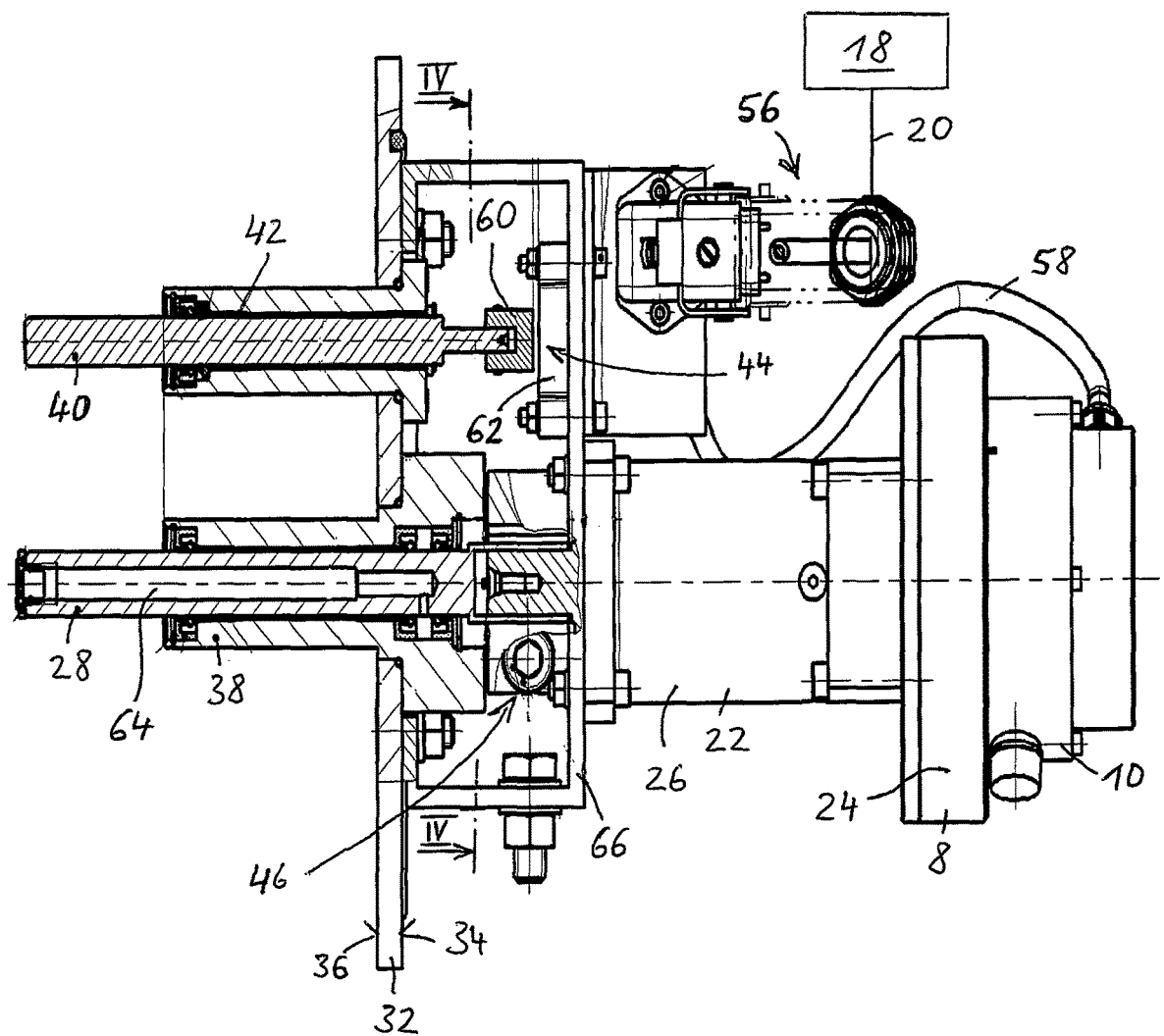
FIG. 3 shows a partial longitudinal section through a windshield wiper drive according to a further embodiment of the invention.

In accordance with a disclosed embodiment of an electric disk motor 1 shown in FIG. 1 is used in each case as a single drive in an embodiments of windshield wiper drives 2 shown in FIGS. 2 and 3.

The disk motor 1, which may operate in accordance with the principle of a unipolar machine, may have an ironless, disk-shaped rotor 4 composed of an insulating material, on which there are arranged, for example on both sides, conductor tracks composed for example of copper foil. The rotor 4 may be arranged rotationally conjointly on a rotor shaft 6, which may be mounted rotatably in the motor covers 8, 10, wherein one end of the rotor shaft 6, which thus forms an output shaft of the disk motor 1, projects through a central opening of a motor cover 8. On the motor covers 8, 10 that form a stator, there are arranged permanent magnets 12 which are situated in each case opposite the conductor tracks of the rotor 4, and which have for example a circular cross section. The permanent magnets 12 may be conventional permanent magnets or else may be neodymium magnets. The latter exhibit a stronger magnetic field and thus a higher torque in the presence of an unchanged rotor current. Furthermore, a commutator 14 may be provided which has brush holders and carbon brushes 16 guided therein. The rotor 4 accordingly rotates in a homogeneous permanent magnetic field, wherein the motor voltage may be applied to the carbon brushes 16 via a feed line 20 connected to electrical terminals, and the motor voltage may be supplied via the commutator 14 directly to the rotor 4. The magnetic return path for the disk motor 1 may be then formed by the motor covers 8, 10. A disk motor 1 of the type has a small extent as viewed in the direction of its rotor axis and can therefore be of very shallow construction.

The disk motor 1 may be controlled by an electronic control device 18 shown in FIGS. 2 and 3, which for this purpose may be connected via the feed line 20 to the disk motor 1. The control device 18 may be designed in particular for 4-quadrant operation of the disk motor 1.

FIG. 2 shows a partial longitudinal section through a windshield wiper drive 2 according to an embodiment of the invention. The windshield wiper drive 2 has, in addition to the disk motor 1 shown in FIG. 1, a planetary gearing 22 which may be installed together with the disk motor in a structural unit. Here, it is for example the case that a housing 24 of the disk motor 1, comprising the two motor covers 8, 10, and a housing 26 of the planetary gearing 22 are flange-mounted on one another axially, that is to say as viewed in the direction of the rotor shaft 6 of the disk motor 1. The end of the rotor shaft 6 may be connected rotationally conjointly to an input shaft of the planetary gearing 22, wherein the connection may be not visible here. It is alternatively also possible for a gearwheel of the planetary gearing 22 to be arranged directly on the output shaft or rotor shaft 6, projecting out of the housing 24, of the disk motor 1. An output shaft 28 of the planetary gearing 22 projects through a passage opening 30 of a supporting wall 32, to the first side surface 34 of which the structural unit composed of disk motor 1 and planetary gearing 22 is also fastened. The output shaft 28 of the planetary gearing thus also extends axially beyond the second side surface 36, pointing away from the first side surface 34, of the supporting wall 32, and the output shaft, with its axial elongation, forms a main arm shaft of the windshield wiper drive 2. The main arm shaft 28 may be at least radially mounted not only in the planetary gearing 22 but also, on the opposite side of the supporting wall 32, by means of a bearing flange 38 which may be fixed in this case for example to the second side surface 36. At the free end of the main arm shaft 28 there may be formed a receptacle for a main arm of the windshield wiper, for example in the form of a surface for a clamping action. Consequently, the drive train for the main arm shaft 28 may be composed only of the rotor shaft 6, the input shaft of the planetary gearing 22, the respective gear pairings within the planetary gearing 22, and the output shaft 28 of the planetary gearing, which simultaneously forms the main arm shaft 28. Owing to the small number of components, the drive train may be highly rigid, which also gives rise to high dynamics of the windshield wiper drive 2. The supporting wall 32 may be part of any structure in the region of a windshield of the rail vehicle. Whereas the second side surface 36 of the supporting wall 32 points outward, that is to say into the surroundings, the first side surface 34 points inward.

Parallel to the main arm shaft 28, there may be provided a secondary or parallel arm shaft 40 for a secondary or parallel arm of the windshield wiper. The secondary or parallel arm shaft 40 may be axially and radially mounted in a further bearing flange 42, which may be fixed for example to the second side surface 36 of the supporting wall 32. The secondary or parallel arm shaft 40 has, on its free end, a receptacle for the secondary or parallel arm of the windshield wiper, for example likewise in the form of a surface for a clamping action. The secondary or parallel arm shaft 40 itself does not have a drive, and is in a known manner driven in rotation indirectly by the main arm shaft 28 via the windshield wiper fastened to the main arm shaft 28 and to the secondary or parallel arm shaft 40. In an alternative embodiment, a secondary or parallel arm shaft 40 may also be dispensed with. Then, the windshield wiper has only a main arm, and the windshield wiper drive 2 has only a main arm shaft 28, to which the main arm may be fastened and by which the main arm may be driven in rotation. The back-and-forth movement of the windshield wiper initiated by the actuation of the disk motor 1 then occurs in a plane perpendicular to the main arm shaft 28 or to the secondary or parallel arm shaft 40.

The windshield wiper drive 2 furthermore has a rotational angle sensor device 44, which in this case may be formed for example by a contactless rotational angle sensor in the form of a magnetic field sensor. A rotor of the magnetic field sensor may be in this case arranged for example on the end of the rotor shaft 6 of the disk motor 1, for example in the form of a permanent magnet. A stator of the magnetic field sensor 44, for example in the form of an electrical coil, may be for example fastened to the motor cover 10 which serves for the mounting of the end of the rotor shaft 6. As a result of rotation of the rotor shaft 6, the magnetic field changes, which may be detected by evaluation electronics integrated in the magnetic field sensor, wherein a corresponding electrical signal may be then transmitted via a signal line (not shown here) to the electronic control device 18. The electrical signal then represents the angular position of the rotor shaft 6, which can be converted, by means of the known speed reduction ratio of the planetary gearing 22, into the angular position of the main arm shaft 28, and thus the present actual rotational position of the windshield wiper can be determined. Then, the electronic control device 18, to which for example a value for a setpoint rotational position, setpoint rotational end position and/or a setpoint rotational speed of the windshield wiper input by means of an operating device may be available, can adapt the actual rotational position of the windshield wiper or an actual rotational speed of the windshield wiper to the setpoint values. Instead of such regulation, it is however also possible for merely control of the disk motor 1 with regard to the attainment of particular rotational positions, rotational end positions and/or rotational speeds to be provided without regulation, wherein feedback of the corresponding actual values provided by means of the rotational angle sensor device 44 may be expedient in this case too.

The disclosed embodiment shown in FIG. 2 may have a mechanical rotational angle delimiter 46 for the main arm shaft 28, for the purposes of restricting the angle range through which the windshield wiper moves to a maximum possible angle range, even in the event that the electronic control device 18 fails, for example. The rotational angle delimiter 46 is in this case arranged for example on that side of the supporting wall 32 which is averted from the structural unit composed of disk motor 1 and planetary gearing 22.

Figure 4:
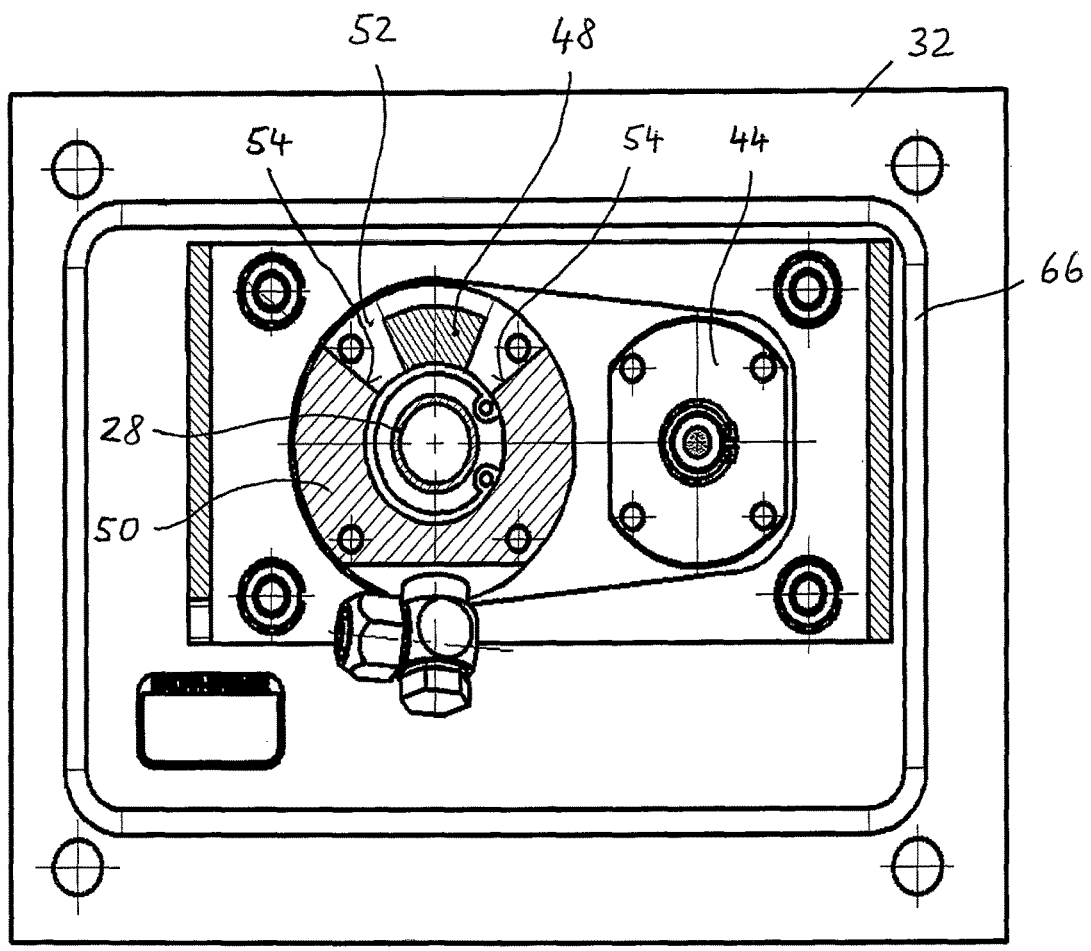
FIG. 4 shows a cross-sectional illustration along the line IV-IV of FIG. 3, in which in particular a mechanical rotational angle delimiter is visible.

The mechanical rotational angle delimiter 46, as may be used in the embodiment of FIG. 2, may be designed analogously to the rotational angle delimiter used in the embodiment of FIG. 3, such that, for the purposes of explanation, reference may also be made here to FIG. 4, which shows the rotational angle delimiter 46 of the exemplary embodiment of FIG. 3 in cross section.

Here, the rotational angle delimiter 46 has a projection 48 which may be driven by the main arm shaft 28, for example in the form of an axially projecting lug, which may be arranged radially offset with respect to the central axis of the main arm shaft, of a clamping ring which may be clamped on the main arm shaft. Furthermore, the rotational angle delimiter has a static delimiting element 50 with a recess 52 into which the projection 48 projects, wherein delimiting surfaces 54 of the recess 52 constitute stop surfaces for the projection 48.

Here, the static delimiting element 50 may be formed for example by a holed plate fixed directly or indirectly to the supporting wall, in which holed plate there may be formed a circular-sector-shaped hole 52 which may be arranged offset from the central axis of the main arm shaft 28 and into which the lug 48 projects axially in relation to the central axis of the main arm shaft 28. The lug 48 itself is in this case likewise of circular-sector-shaped form such that it can bear flush against lateral delimiting surfaces 54 of the hole 52. The holed plate 50 may be detachably fastened to the supporting wall 32 in order that it can be exchanged for a different holed plate with changed hole dimensions and delimiting surfaces in order to change the angular area covered by the windshield wiper. In this respect, the mechanical rotational angle delimiter 46 may be duly predefined here, but is nevertheless adjustable through exchange of the holed plate 50.

It would alternatively also be possible for the mechanical rotational angle delimiter 46 to be of adjustable form in the sense that the delimiting surfaces 54 or mechanical stops of the rotational angle delimiter are adjustable or variable in terms of their position, without parts having to be exchanged for this purpose.

Owing to the rotational angle detection on the rotor shaft 6 of the disk motor 1 and the thus somewhat larger axial extent, the embodiment illustrated in FIG. 2 may be suitable in particular for installation in rail vehicles, in the case of which the installation depth for the windshield wiper drive may be less restricted than in the case of, for example, LRVs (streetcars).

In the further embodiment of a windshield wiper drive 2 shown in FIG. 3, components and assemblies which are identical and of identical action in relation to the embodiment shown in FIG. 2 are denoted by the same reference designations. By contrast to the embodiment of FIG. 2, a central electrical connector 56 for the windshield wiper drive 2 can be seen in the embodiment of FIG. 3, which connector may be connected via a line 58 to the disk motor 1. Furthermore, the rotational angle sensor device 44 may, in this case too, be arranged for example in the form of a contactless magnetic field sensor in this case not on the rotor shaft 6 but on the secondary or parallel arm shaft 40. More specifically, a rotor of the magnetic field sensor 44, for example in the form of a permanent magnet 60, rotates with the secondary or parallel arm shaft 40, whereas the associated stator may be arranged in a static sensor housing 62. It is self-evident that, in this case, too, the magnetic field sensor 44 may be connected via a signal line (not shown here) to the central electrical connector 56. The central electrical connector 56 has for example a part of an electrical plug connection in the form of a socket, to which there may be then connected a plug of a feed line 20 which may be connected to the electronic controller 18. Thus, the rotational position of the secondary or parallel arm shaft 40 may be signaled to the electronic control device 18 by the magnetic field sensor 44.

Furthermore, the rotational angle delimiter 46 is in this case arranged for example on the first side surface 34, which faces toward the structural unit composed of disk motor 1 and planetary gearing 22, of the supporting wall 32. Also, the two bearing flanges 38, 42 for the main arm shaft 28 and the secondary arm shaft 40 respectively are fixed to the first side surface 34 of the supporting wall 32 so as to project through passage bores. Furthermore, the main arm shaft 28 has a central bore 64 which serves as a washing water feed for washing water which may be applied to the windshield from a dispensing device for example in the form of nozzles. Finally, the structural unit composed of disk motor 1 and planetary gearing 22 may be fastened to a housing 66, which in turn may be fixed to the first side surface 34 of the supporting wall 32. The rotational angle delimiter 46 and the rotational angle sensor 44 are also accommodated in the housing 66.

The embodiment illustrated in FIG. 3 in, owing to its small axial extent owing to the rotational angle detection on the secondary or parallel arm shaft 40, suitable in particular for installation in rail vehicles in which the installation depth for the windshield wiper drive may be restricted, such as for example EMU (Electrical Multiple Unit) or DMU (Diesel Multiple Unit) vehicles.

The proposed windshield wiper drive 2 for rail vehicles, as may be fastened to the supporting wall 32 as a unit which can be mounted and dismounted there as a whole, may be thus composed substantially of the disk motor 1, the planetary gearing 22, the rotational angle sensor device 44 and the mechanical rotational angle delimiter 46. The planetary gearing 22 may be mounted directly on the disk motor 1 and may form a structural unit together with the latter. The electronic control device 18 is in this case may not a constituent part of the windshield wiper drive 2, though could likewise be a part thereof.

In applications for use on streetcars (LRV) or other low-speed vehicles, the planetary gearing 22 may have a lengthened output shaft 28 onto which the windshield wiper arm can be directly mounted.

The rotational angle sensor device 44 may be distinguished by an optionally analog output signal which may be directly related to the present rotational position of the windshield wiper arm or the position of the output shaft 28 of the planetary gear set. As an output signal, a standard current signal of 4-20 mA may be used, because this may be distinguished by very high EMC resistance.

The windshield wiper drive 2 may be suitable both for segment wiper arms and for parallel wiper arms and permits a wiping angle of for example between approximately 30° and 180°.

The scope of the invention also encompasses embodiments which comprise any desired combination of features of the embodiments described here.

The invention relates to a windshield wiper drive of a windshield wiper apparatus of a rail vehicle, having at least one electric motor, a gearing, the input shaft of which may be connected to an output shaft of the motor, wherein an output shaft of the gearing may be provided for driving at least one windshield wiper arm, which pivots back and forth with the output shaft, of a windshield wiper, a rotational angle sensor device which detects a rotation of at least one element of the windshield wiper drive, and a mechanical rotational angle delimiter which mechanically limits a rotational movement of at least one element of the windshield wiper drive.

Furthermore, the invention also relates to a windshield wiper apparatus of a rail vehicle comprising at least one windshield wiper drive, and to a rail vehicle having a windshield wiper apparatus.

A windshield wiper drive of the type is known from DE 10 2012 023 638 A1. In the document, in the embodiment of FIGS. 7 to 9, a motor (not shown in any more detail) drives a worm shaft of a worm gearing, the worm gear of which serves as output shaft, which drives a windshield wiper arm of a windshield wiper. The rotational angle sensor device may be in the form of a contact sensor means and has, on the one hand, contact pins arranged on a gearing case and, on the other hand, a conductor structure arranged on the worm gear, along which conductor structure the contact pins slide during a rotation of the worm gear. The mechanical rotational angle delimiter has an arcuate movement section radially offset from the central axis of the worm gear, which arcuate movement section performs an arcuate movement when the worm gear rotates. The movement section can, during a rotation of the worm gear, move within a slide hole of a lever, wherein ends of the slide hole form stops for the movement section such that the movement section abuts against the stop of the slide hole when the worm gear may be rotated beyond an angle range of 270 degrees.

LIST OF REFERENCE DESIGNATIONS

1 Disk motor
2 Windshield wiper drive
4 Rotor
6 Rotor shaft
8 Motor cover
10 Motor cover
12 Permanent magnets
14 Commutator
16 Carbon brushes
18 Control device
20 Feed line
22 Planetary gearing
24 Housing
26 Housing
28 Output shaft
30 Passage opening
32 Supporting wall
34 First side surface
36 Second side surface
38 Bearing flange
40 Secondary or parallel arm shaft
42 Bearing flange
44 Rotational angle sensor device
46 Rotational angle delimiter
48 Lug
50 Delimiting element
52 Recess
54 Delimiting surfaces
56 Central connector
58 Line
60 Permanent magnet
62 Sensor housing
64 Bore
66 Housing

The invention claimed is:

1. A windshield wiper drive of a windshield wiper apparatus of a rail vehicle, the drive comprising:
   at least one electric motor;
   a gearing, an input shaft of which being connected to an output shaft of the electric motor, wherein an output shaft of the gearing is provided for driving at least one windshield wiper arm of a windshield wiper, which pivots back and forth with the output shaft of the gearing;

a rotational angle sensor device which detects a rotation of at least one element of the windshield wiper drive; and a mechanical rotational angle delimiter which mechanically limits a rotational movement of at least one element of the windshield wiper drive, wherein the electric motor is formed by a disk motor, and the gearing is formed by a planetary gearing, wherein said windshield wiper drive has, at the output side, a main arm shaft, which is driven in rotation by the output shaft of the planetary gearing, and a parallel arm shaft extending from a supporting wall in the same direction as the main arm shaft, which is driven in rotation by rotation of the main arm shaft, wherein the main arm shaft is designed for the fastening of a main arm and the parallel arm shaft is configured for the fastening of a parallel arm of the windshield wiper.

2. The windshield wiper drive of claim 1, wherein the disk motor has an ironless, disk-shaped rotor, which is composed of an insulating material and, on one or both sides of which there are arranged conductor tracks, at least one motor cover, which forms a stator and on which there are arranged permanent magnets which are situated opposite the conductor tracks, and a commutator.

3. The windshield wiper drive of claim 2, wherein the output shaft of the disk motor is formed by a rotor shaft which bears the rotor.

4. The windshield wiper drive claim 2, wherein the commutator of the disk motor has brush holders and carbon brushes guided therein.

5. The windshield wiper drive of claim 1, wherein the disk motor forms a structural unit together with the planetary gearing.

6. The windshield wiper drive of claim 5, wherein output shaft of the disk motor is directly connected to the input shaft of the planetary gearing, or a gearwheel of the planetary gearing is arranged on the output shaft of the disk motor.

7. The windshield wiper drive of claim 1, wherein the output shaft of the planetary gearing has a receptacle for the direct mounting of the windshield wiper arm of the windshield wiper.

8. The windshield wiper drive of claim 1, wherein the rotational angle sensor device has at least one contactless rotational angle sensor.

9. The windshield wiper drive of claim 8, wherein the rotational angle sensor device has at least one contactless magnetic field sensor which is coupled to the output shaft of the planetary gearing or to a rotary element which is coupled to the output shaft.

10. The windshield wiper drive of claim 9, wherein a permanent magnet of the contactless magnetic field sensor is connected rotationally conjointly to a shaft of the windshield wiper drive.

11. The windshield wiper drive of claim 8, wherein the rotational angle sensor device is arranged within a housing of the disk motor and detects the rotational angle of the rotor shaft of the disk motor.

12. The windshield wiper drive of claim 1, wherein the rotational angle sensor device detects the rotational angle of the secondary or parallel arm shaft of the windshield wiper drive.

13. The windshield wiper drive claim 1, wherein the mechanical rotational angle delimiter has a projection, which is driven by a shaft of the windshield wiper drive, and a static delimiting element, which has a recess into which the projection projects, wherein delimiting surfaces of the recess constitute stop surfaces for the projection.

14. The windshield wiper drive of claim 13, wherein the projection is arranged on the main arm shaft of the windshield wiper drive.

15. The windshield wiper drive claim 1, wherein the planetary gearing is designed to reduce the rotational speed of the disk motor.

16. The windshield wiper drive claim 1, wherein an electrical or electronic control device is provided for controlling the disk motor in a manner dependent on signals of the rotational angle sensor device.

17. The windshield wiper drive of claim 16, wherein the electrical or electronic control device is designed for 4-quadrant operation of the disk motor.

18. A rail vehicle having a windshield wiper drive as claimed in claim 1.

* * * * *